US010387796B2

(12) United States Patent
Kruglick

(10) Patent No.: US 10,387,796 B2
(45) Date of Patent: Aug. 20, 2019

(54) METHODS AND APPARATUSES FOR DATA STREAMING USING TRAINING AMPLIFICATION

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 552 days.

(21) Appl. No.: 14/758,812

(22) PCT Filed: Mar. 19, 2014

(86) PCT No.: PCT/US2014/031204
§ 371 (c)(1),
(2) Date: Jul. 1, 2015

(87) PCT Pub. No.: WO2015/142325
PCT Pub. Date: Sep. 24, 2015

(65) Prior Publication Data
US 2016/0292590 A1 Oct. 6, 2016

(51) Int. Cl.
*G06N 20/00* (2019.01)
*G06F 16/2455* (2019.01)

(52) U.S. Cl.
CPC ....... *G06N 20/00* (2019.01); *G06F 16/24568* (2019.01)

(58) Field of Classification Search
None
See application file for complete search history.

(56) References Cited

U.S. PATENT DOCUMENTS 7,853,485 B2 12/2010 Song et al.
2009/0037351 A1 2/2009 Kristal et al.
2011/0040706 A1* 2/2011 Sen ...................... G06N 99/005 706/12
2012/0089545 A1* 4/2012 Mei ...................... G06K 9/6257 706/20
2012/0290510 A1 11/2012 Faddoul et al.
2013/0282627 A1 10/2013 Faddoul et al.
2013/0294642 A1* 11/2013 Wang ................ G06F 17/30855 382/103

OTHER PUBLICATIONS

"AdaBoost," Wikipedia, accessed at https://web.archive.org/web/20130707023722/http://en.wikipedia.org/wiki/AdaBoost, last modified on Jun. 28, 2013, pp. 4.
"ETE 2012—Nathan Marz on Storm," ChariotSolutions, accessed at http://web.archive.org/web/20131017222836/https://www.youtube.com/watch?v=bdps8tE0gYo, Published on May 15, 2012, pp. 2.

(Continued)

*Primary Examiner* — Li Wu Chang

(57) ABSTRACT

In some examples, a computing system may gathering, from a machine learning unit associated with the computing system, data as a training data, label the data to identify the labeled data as the training data, which may be then recirculated for each of one or more analytics modules of the machine learning unit.

26 Claims, 5 Drawing Sheets

(56) References Cited

OTHER PUBLICATIONS

"Python Implementation of Classic Algorithms," Pyclassic, accessed at https://code.google.com/p/pyclassic/source/browse/trunk/adaboost.py?r=11, accessed on Jun. 8, 2015, pp. 2.
Asami, T., et al., "A Stream-weight and Threshold Estimation Method Using Adaboost for Multi-stream Speaker Verification," 2006 IEEE International Conference on Acoustics, Speech and Signal Processing, 2006, vol. 5, pp. V-1081-V-1084 (May 14-19, 2006).
Drucker, H., et al., "Improving Performance in Neural Networks Using a Boosting Algorithm", Advances in Neural Information Processing Systems, 1993, pp. 42-49.
Favre, B., et al., "Open-source implementation of Boostexter (Adaboost based classifier)," Icsiboost, accessed at https://web.archive.org/web/20130601234409/http://code.google.com/p/icsiboost, 2007, pp. 2.
Freund, Y and Schapire, R.E., "A Decision-Theoretic Generalization of On-line Learning and an Application to Boosting," proceedings of the Second European Conference on Computational Learning Theory, Lecture Notes in Computer Science, vol. 904, pp. 23-37, Springer Berlin Heidelberg (Mar. 1995).
Gaber, M. M., et al., "Mining data streams: a review," ACM SIGMOD Record, vol. 34, Issue 2, pp. 18-26 (Jun. 2005).
Golla, R.G., "Viola Jones face detection and tracking explained," accessed at https://www.youtube.com/watch?feature=player_detailpage&v=WfdYYNamHZ8#t=1877s, Published on Sep. 16, 2012, pp. 3.
Hoens, T.R., et al., "Learning from streaming data with concept drift and imbalance: an overview," Progress in Artificial Intelligence, vol. 1, Issue 1, pp. 89-101 (Apr. 1, 2012).
International Search Report and Written Opinion for International Patent Application No. PCT/US14/31204 dated Aug. 28, 2014.
Kolter, J.Z., and Maloof, M. A., "DynamicWeighted Majority: An Ensemble Method for Drifting Concepts," Journal of Machine Learning Research, vol. 8, pp. 2755-2790 (Dec. 1, 2007).
Mitéran, J., et al., "Automatic Hardware Implementation Tool for a Discrete Adaboost-based Decision Algorithm," EURASIP Journal on Applied Signal Processing, vol. 2005, Issue 7, pp. 1035-1046, Hindawi Publishing Corporation (Jan. 1, 2005).
Nunn, C., et al., "An improved adaboost learning scheme using LDA features for object recognition," 12th International IEEE Conference on Intelligent Transportation Systems, 2009, pp. 1-6 (Oct. 3-7, 2009).
Ramdas, A., "Bootstrapping, AdaBoosting, Uncertainty Sampling for Genre Classification of Fine Art Paintings," pp. 1-8 (2011).
Rastgoo, M., "Pruning AdaBoost for Continuous Sensors Mining Applications," In Workshop on Ubiquitous Data Mining in conjunction with the 20th European Conference on Artificial Intelligence, pp. 53-57 (Aug. 27-31, 2012).
Schapire, R., "Inventing the Science Behind the Service," AT&T Researchers, accessed at http://www.research.att.com/talks_and_events/2012_distinguished_speakers/r_schapire_explaining_adaboost/2012_DSS_schapire_explaining_adaboost?fbid=--qlhwxQW7Z, Jul. 25, 2012, pp. 2.
Schapire, R.E., and Singer, Y., "Improved Boosting Algorithms using Confidence-rated Predictions," Vision and Learning, pp. 25 (Oct. 23, 2001).
Scholz, M., and Klinkenberg, R., "An Ensemble Classifier for Drifting Concepts," In Proceedings of the Second International Workshop on Knowledge Discovery in Data Streams, pp. 53-64 (2005).
Treptow, A., and Zell, A., "Combining Adaboost Learning and Evolutionary Search to select Features for Real-Time Object Detection," Congress on Evolutionary Computation, vol. 2, pp. 2107-2113 (Jun. 19-23, 2004).
Vezhnevets, A., and Vezhnevets, V., "Modest AdaBoost—Teaching AdaBoost to Generalize Better," GraphiCon, pp. 1-4 (2005).
Xia, H., and Steven C.H., H., "MKBoost: A Framework of Multiple Kernel Boosting," IEEE Transactions on Knowledge and Data Engineering, vol. 25, Issue 7, pp. 1574-1586 (Apr. 24, 2012).
Yuh-Jye, L., et al., "Anomaly Detection via Online Oversampling Principal Component Analysis," IEEE Transactions on Knowledge and Data Engineering, vol. 25, Issue 7, pp. 1460-1470 (May 15, 2012).

* cited by examiner

300

METHODS AND APPARATUSES FOR DATA STREAMING USING TRAINING AMPLIFICATION

This Application is the U.S. National Stage filing under 35 U.S.C. § 371 of International Application No. PCT/US14/31204 filed on Mar. 19, 2014. The disclosure of the International Application No. PCT/US14/31204 is hereby incorporated by reference in its entirety.

TECHNICAL FIELD

The embodiments described herein pertain generally to adaptive data analytics and, more particularly, to streaming data analytics.

BACKGROUND

Unless otherwise indicated herein, the approaches described in this section are not prior art to the claims in this application and are not admitted to be prior art by inclusion in this section.

Real-time systems perform analytics to correlate and predict event streams. Machine learning or classification methods are often applied to real-time data analytics. Often, this introduces problems if the underlying data distribution is likely to change over time. For example, companies collect an increasing amount of data (e.g., sales figures, customer data, etc.) to find patterns in customer behavior and to predict future sales, and this data generally changes over time.

As customer behavior tends to change over time, the prediction model should adapt accordingly. Adaptive data analytics systems often utilize batch processing systems. In batch analysis it is fairly easy to divide data into discrete time periods and perform classifier rediscovery or comparisons that are not in real-time. Typically, however, real-time streams are effectively infinite in length and continuous, and therefore it is difficult to adopt streaming adaptive solutions at scale.

SUMMARY

In one example embodiment, a method may include: gathering, from a machine learning unit, data as a training data; labeling the data to identify the labeled data as the training data; and recirculating the labeled data for each of one or more analytics modules of the machine learning unit.

In another embodiment, a non-transitory computer-readable medium, hosted on a computing device/system, may store one or more executable instructions that, when executed, cause one or more processors to identifying one or more analytics modules of a machine learning unit for training; and recirculating a training data through each of the one or more analytics modules a respective number of times to train the one or more analytics modules.

In yet another example embodiment, an apparatus may include a machine learning unit comprising: a source module configured to provide a streaming input data; a plurality of analytics modules, each of the analytics modules coupled to receive and analyze the streaming input data to provide a respective data item and a respective classifier score; and a joint module coupled to collect the data items and classifier scores from the analytics modules to provide a stream of classified data. The apparatus may also include an adaptive recirculation module coupled to the machine learning unit, the adaptive recirculation module configured to perform operations comprising: gathering, from the joint module, data as a training data; labeling the data to identify the data as the training data; and recirculating the labeled data for a respective number of times for each of a subset of the analytics modules.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
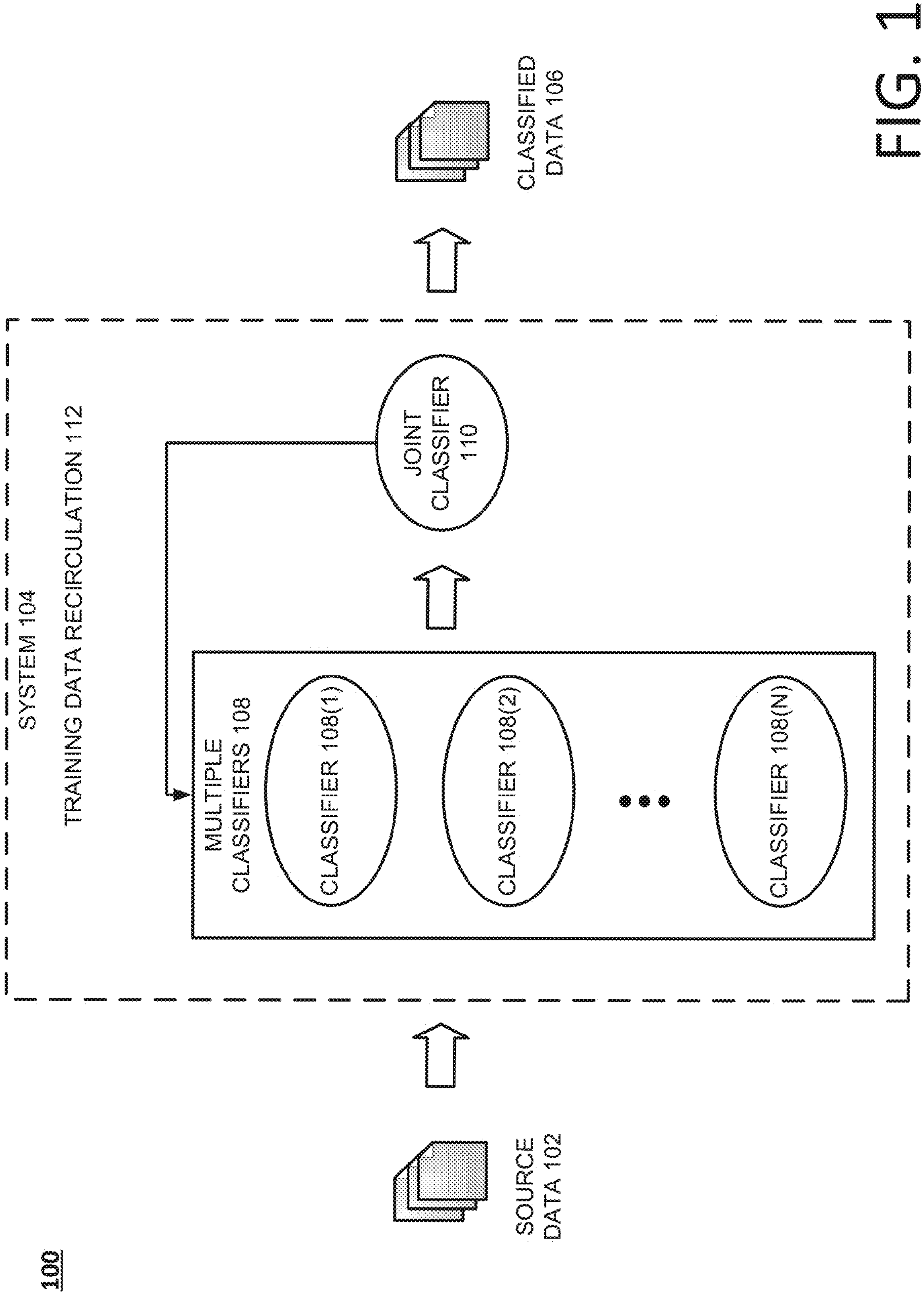
FIG. 1 shows an example scheme in which streaming analytics by selective training data recirculation may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Embodiments of the present disclosure relate to a streaming recirculation approach to applying an Adaptive Boosting (hereafter "AdaBoost") meta-algorithm as an adaptation amplifier for real-time data analytics. A real-time data analytics system may identify training cases, interchangeably referred to as training data hereafter, and recirculate the training data a certain number of times with respect to each classifier of the system. Each recirculation pass may create AdaBoost-style training amplification within the system such that each classifier has per-sample learning. A set of filters of the system may output the data to allow a user to continue to see unaltered results while gains of the amplified training are achieved.

The example embodiments described herein implement AdaBoost classifier learning amplification within the framework of streaming and continuous sample processing, thus rendering AdaBoost-style training systems suitable for streaming real-time analytics.

FIG. 1 shows an example scheme 100 in which streaming analytics by selective training data recirculation may be implemented, arranged in accordance with at least some embodiments described herein. As depicted, scheme 100 includes, at least, source data 102, a system 104 for classifying source data 102, and classified data 106. Source data 102 may be any streaming input data such as network data or click data. In some embodiments, source data 102 may represent the output of an earlier processing unit. For example, source data 102 may be output, by a prior processing unit, as a stream to system 104.

In some embodiments, system 104 may include multiple classifiers 108, such as classifier 108(1), classifier 108(2) . . . and classifier 108(*n*). In some embodiments, multiple classifiers 108 may include one or more classifiers that are not 100% correct. Such classifiers may be referred to as weak classifiers hereafter. In some embodiments, multiple classifiers 108 may include one or more classifiers that are 100% correct. Such classifiers may be referred to as strong classifiers hereafter. In these embodiments, classifiers 108 may refer to any sort of existing classifiers such as, for example, a principal components analysis unit vector multiplication, a state value machine, a matrix multiplication kernel, Bayesian classifier, or a simple scalar value computation. In these embodiments, each of classifiers 108 may output data items (e.g., tuples of data) and a classifier score associated with each of the data items.

System 104 may also include a joint classifier 110, which may be configured to collect classified data 106 (e.g., as a stream of output) and/or scores for each data item. In some embodiments, classified data 106 may facilitate fraud detection, intrusion detection, and/or identification of customer experience modifications to deliver, for example.

In some embodiments, system 104 may facilitate an operation of training data recirculation 112 to train the multiple classifiers 108. In these embodiments, data results passing through joint classifier 110 may be sifted for one or more training cases including training events so that classifications associated with the training events may be verified (e.g., having high confidence). For example, the outputs of the classifier 108(1), classifier 108(2), and classifier 108(*n*) may be checked to identify one or more weak classifiers that were incorrect about the training data. In these instances, training data may be available with certainty as well as clarity and/or confirmed by one or more secondary channels that provide verification of some transactions (e.g., by means of a secure hardware chip in the user's credit card). In some embodiments, selection of training data may be implemented in various ways. For example, there may be a subset of classification rules that are known to be 100% correct without producing an optimum mix of false-positives to false-negatives (e.g., some fraud detection signals may produce many false-negatives as a cost of no false positives). The subset of classification rules may be used to select training data to refine other classifiers that balance out the false-negatives.

In some embodiments, system 104 may modify or alter the training data by associating identifying information (e.g. a training ID) with the training data. In some embodiments, a weighting factor (e.g., an AdaBoost weighting factor) may be converted into N copies, the number of which may be determined on a case-by-case basis, so that N copies of the training data may be recirculated as described below. System 104 may recirculate the training data by recirculating the training data through one or more of classifiers 108. In some embodiments, system 104 may recirculate the training data through select ones of the classifiers 108 for the determined number of times (e.g., N times). For example, system 104 may recirculate the training data N times through a selected one of classifiers 108. Additionally, system 104 may recirculate the training data once through others of classifiers 108 that failed to classify the same training data previously. The selected classifier through which the training data is recirculated for N times may be referred to as the dominant classifier.

In some embodiments, system 104 may remove the recirculated training data from the classified data 106 after the recirculated training data is outputted by classifiers 108 and joint classifier 110. System 104 may determine which one or more of classifiers 108 are still incorrect. In some instances, system 104 may recirculate training data through the weak classifiers and not those of classifiers 108 that have been treated as dominant classifiers in previous cycles. Training data recirculation 112 may be repeated until each of the one or more weak classifiers 108 that was previously incorrect about the training data has been treated as a dominant classifier, e.g., having the training data recirculated through for N times. In some embodiments, the training data may be recirculated with different population counts for each classifier on each recirculation pass (e.g., different number of cycles for each of the classifiers 108) to create AdaBoost-style training amplification so that each of the classifiers 108 has per-sample learning.

Figure 2:
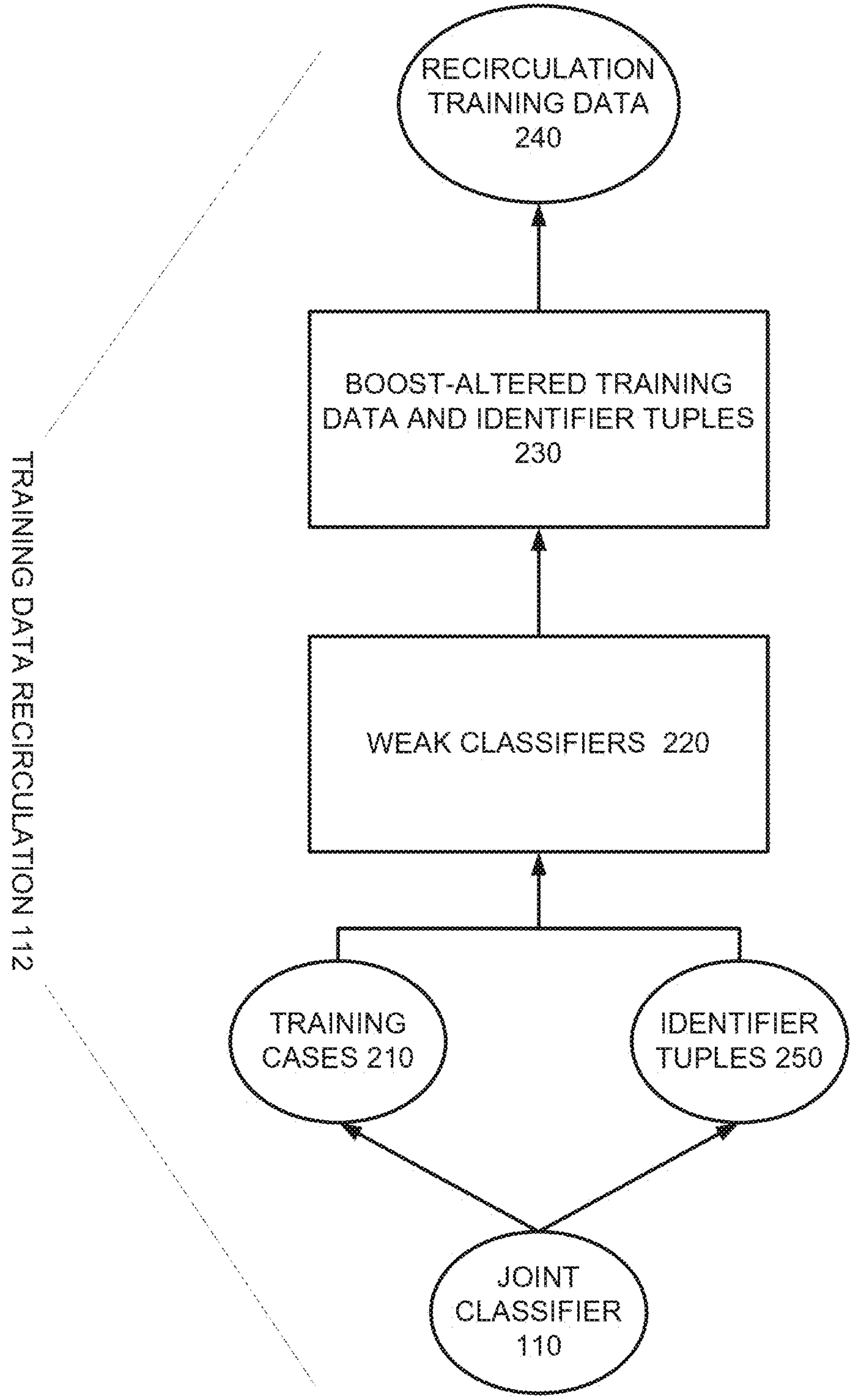
FIG. 2 shows another example scheme in which streaming analytics by selective training data recirculation may be implemented, arranged in accordance with at least some embodiments described herein.

FIG. 2 shows an example implementation 200 of training data recirculation 112 of system 104, arranged in accordance with at least some embodiments described herein. As illustrated in FIG. 2, data results through joint classifier 110 may be first sifted for training cases 210 to look for training events such as classifications that are verified or have high confidence of being correct. The outputs of multiple classifiers 108 may be then checked to identify one or more weak classifiers 220 that failed to classify, and thus were incorrect about, the training cases 210 previously. This output may be captured before or after joint classifier 110.

Training data of the training cases 210 may be altered by system 104 associating identifying information with it (e.g. a training ID) with training cases 210, and an AdaBoost weighting factor may be converted into a number of copies to generate boost-altered training data and identifier tuples 230. Training data (i.e., recirculation training data 240) may then be recirculated by inputting the training data a determined number of times into the next dominant classifier and once to the one or more weak classifiers.

When the recirculation training data 240 comes out of joint classifier 110, it may be ignored by the classified stream by removing it and then re-gathering to generate identifier tuples 250. When the recirculation training data 240 is identified again, system 104 may determine which of the one or more weak classifiers are still incorrect (e.g., failed to classify the recirculation training data 240). This process may be repeated until each of the one or more weak classifiers that was originally incorrect has been treated as a dominant classifier for a single recirculation. The overall effect is reweighted training over time, with no impact on the user of the data. The normal stream architecture is maintained so that there is no need to modify the streaming system except for the addition of the operation of training data recirculation 112 and a filtering unit after joint classifier 110. All existing scaling, management, and deployment systems may still apply. The data is not batched with discrete training events applied to classifiers 108.

The following illustrative implementation of system 104 takes identification of suspected fraud instances as an example. Consider that multiple classifiers 108 include, e.g., six classifiers A, B, C, D, E, and F. Each of these classifiers A-F may output a transaction record ID annotated with a respective score. Further consider that the strength of the classifiers A-F to be in alphabetical order (e.g., "A" is the strongest classifier and "F" is the weakest classifier among the six classifiers A-F in this example), and that only classifiers A and D are verified as non-fraudulent on the first pass of a particular example transaction. System 104 may then gather a training case, or training data, that is known to be valid, and may also determine that classifiers B, C, E, and F were incorrect about the particular transaction. As a result, classifiers B, C, E, and F will receive recirculated copies of the transaction data. System 104 may use any of the standard AdaBoost recipes (e.g., Adaboost.M2) to calculate a number of times (e.g., M) that the training data should be recirculated through the next dominant classifier (i.e., classifier B) that was incorrect. Classifier B may receive M copies of the training data delivered as inputs while each of classifiers C, E, and F receives one copy of the training data. These instances of training data may be labeled as training cases in various ways. For example, system 104 may alter one of the records in the data item (e.g., tuple of data), that makes up each streaming data item, to add an identifier.

When these data records come out of joint classifier 110, the tuples of data with the added identifiers may be gathered, and the current performance of each of the classifiers (i.e., classifiers B, C, E, and F) that were previously incorrect may be evaluated. Here, classifier B may not receive more copies of the training data again. Suppose that classifiers C, E, and F are still incorrect about the training data, system 104 may then determine a number of times (e.g., N) that the training data is to be recirculated through the next dominant classifier (i.e., classifier C) that was incorrect. Classifier C may then receive N copies of the training data delivered as inputs while each of classifiers E and F receives one copy of the training data. Accordingly, system 104 may repeat this process with respect to classifier E and F so that each of classifiers B, C, E, and F will have been treated as a dominant classifier for at least one cycle of recirculation.

Figure 3:
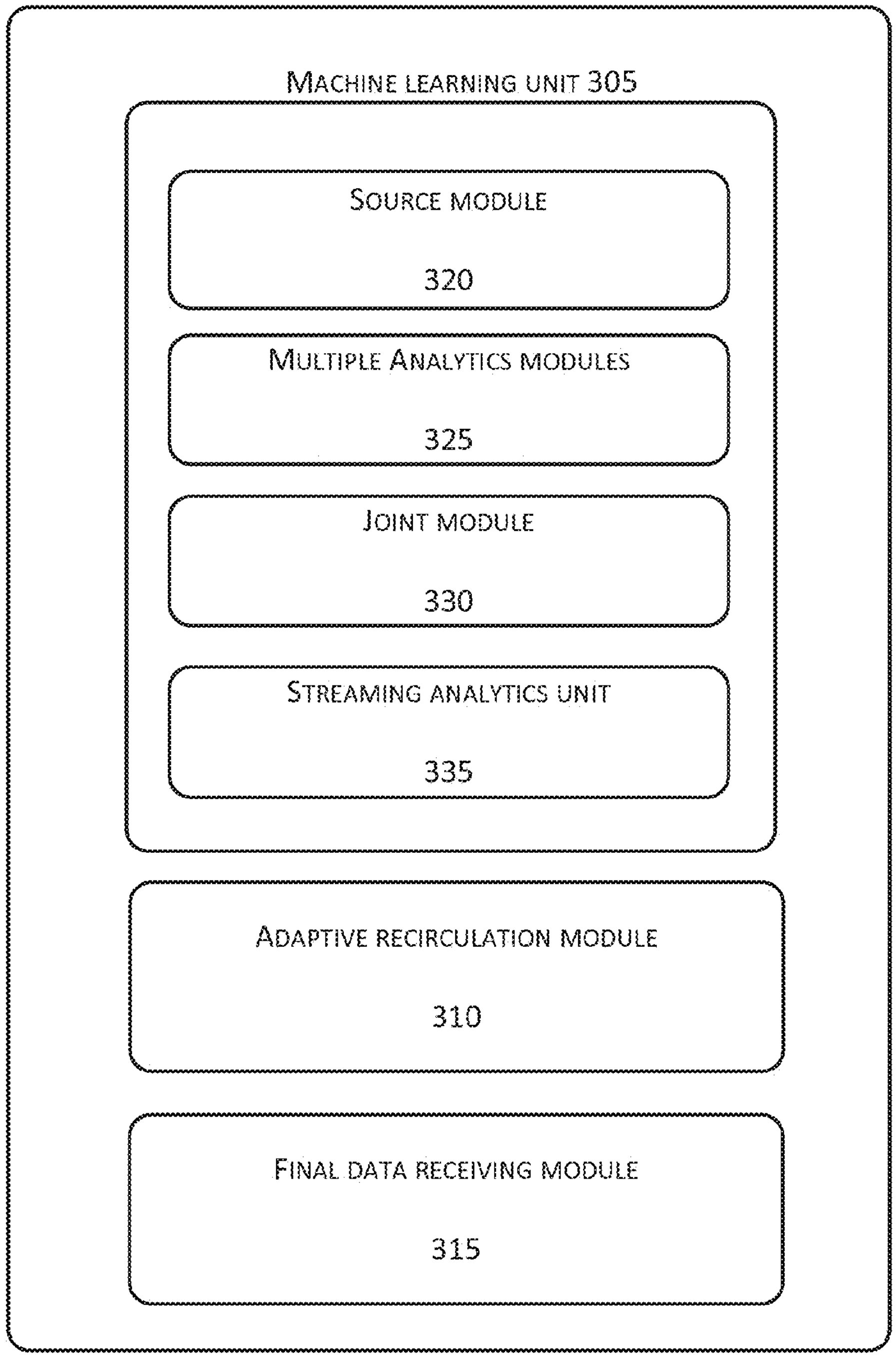
FIG. 3 shows an example configuration of a device with which at least portions of selective training data recirculation may be implemented, arranged in accordance with at least some embodiments described herein.

FIG. 3 shows an example configuration of a device 300 with which at least portions of selective training data recirculation may be implemented, arranged in accordance with at least some embodiments described herein. Device 300 may refer to at least one portion of system 104. As depicted, device 300 may be configured to include a machine learning unit 305, an adaptive recirculation module 310, and a final data receiving module 315. Machine learning unit 305 may include one or more of, but not limited to, the following: a source module 320, multiple analytics modules 325, a joint module 330, and a streaming analytics unit 335.

Source module 320 may refer to one or more components configured, designed, and/or programmed to provide a streaming input data. For example, source module 320 may output streaming input data, which may include a stream of transactional information on credit card purchases, which may be classified to identify suspected fraud instances. Here, training case identification may be implemented through a secondary channel that provides verification of some transactions by means of a secure hardware chip in the user's credit card.

Multiple analytics modules 325 may refer to one or more components configured, designed, and/or programmed to receive and analyze the streaming input data to provide a respective data item and a respective classifier score. Joint module 330 may refer to one or more components configured, designed, and/or programmed to collect the data items and classifier scores from the analytics modules 325 to provide a stream of classified data. From the stream of classified data, final data receiving module 315 may derive conclusions or log data into a storage system associated with device 300.

Streaming analytics unit 335 may refer to one or more components configured, designed, and/or programmed to use an AdaBoost algorithm. As mentioned above, AdaBoost is a meta-algorithm or an algorithm that may be applied to improve the function of other algorithms in the areas of learning, ranking, and classification systems as well as other data analytics. Embodiments of the present disclosure implement AdaBoost classifier learning amplification within the framework of streaming and continuous sample processing.

Adaptive recirculation module 310 may refer to one or more components coupled to machine learning unit 305, configured, designed, and/or programmed to gather, from joint module 330, data as a training data. In some embodiments, adaptive recirculation module 310 may sift the stream of classified data from joint module 330 to select some of the classified data that is known to be valid as the training data. For example, adaptive recirculation module 310 may label the data to identify the data as the training data, and also identify a subset of the analytics modules for training. In some embodiments, adaptive recirculation module 310 may then recirculate the labeled data for a respective number of times for each of a subset of multiple analytics modules 325, and filter out the labeled data from the stream of classified data provided by joint module 330.

In some embodiments, to recirculate the training data, adaptive recirculation module 310 may evaluate outputs of multiple analytics modules 325. In these instances, adaptive recirculation module 310 may determine an output of a first analytics module of the subset of multiple analytics modules 325 to be valid following a recirculation of the training data through the first analytics module. In some instances, the first analytics module may be excluded from the subset of multiple analytics modules 325 for training. Adaptive recirculation module 310 may identify the subset of the analytics modules 325 for training as a result of an output of each of the subset of the analytics modules 325 being invalid.

In some embodiments, for each analytics module of the subset of the analytics modules 325, adaptive recirculation module 310 may calculate a respective number of times that the training data is to be recirculated to the respective analytics module for training. That is, adaptive recirculation module 310 may generate N copies of the training data and provide N−1 copies of the training data to a given analytics module (i.e., to recirculate the training data through the given analytics module N−1 times) while providing the remaining one copy of the training data to the remainder of the subset of the analytic modules 325 (i.e., to recirculate the training data once through those analytics modules).

For example, adaptive recirculation module 310 may select a first analytics module of the subset of the analytics modules 325 for iterations of training, and provide the training data as input to the first analytics module for the calculated respective number of times for the first analytics module. Adaptive recirculation module 310 may also provide the training data once to remaining one or ones of the subset of the analytics modules 325. Likewise, adaptive recirculation module 310 may select a second analytics module of the subset of the analytics modules 325 for iterations of training, and provide the training data as input to the second analytics module for the calculated respective number of times for the second analytics module. Adaptive recirculation module 310 may also provide the training data one to remaining one or ones of the subset of the analytics modules 325.

Examples above have mentioned providing one copy of the training data to the non-dominant analytics modules, for example to assess the up-to-date performance of those modules, in some cases the non-dominant analytics modules may receive zero copies of the training data. In such cases each number of copies to recirculate may be calculated based on the initial response.

Figure 4:
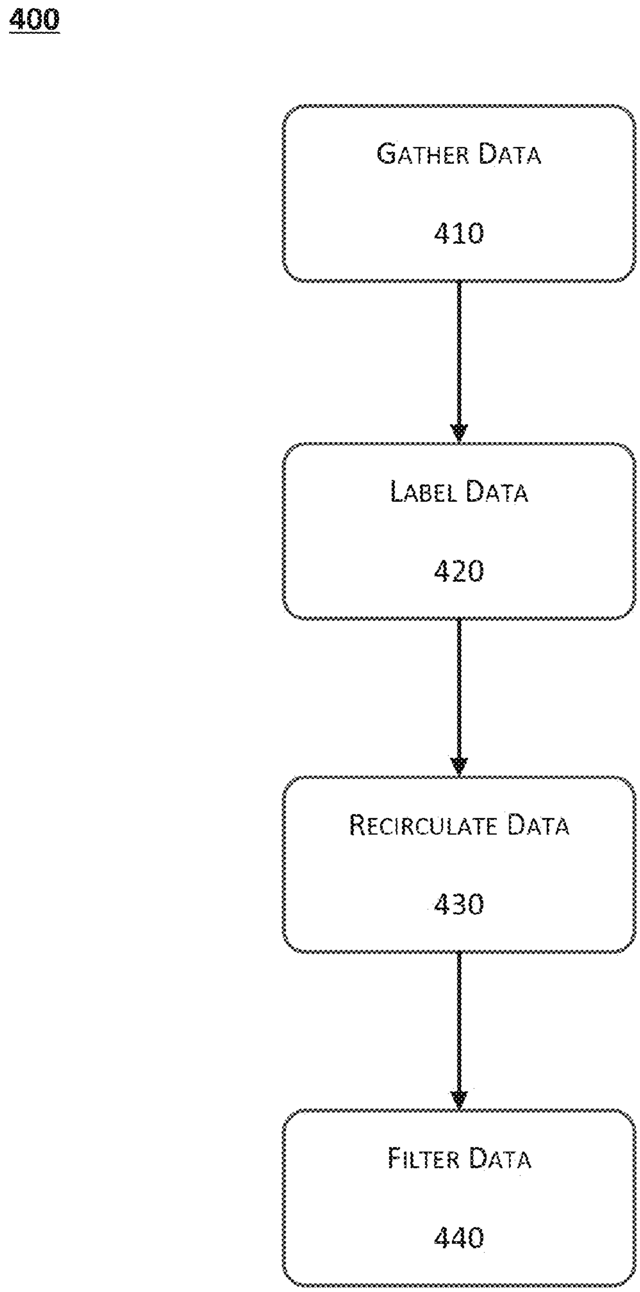
FIG. 4 shows an example processing flow with which streaming analytics by selective training data recirculation may be implemented, arranged in accordance with at least some embodiments described herein.

FIG. 4 shows an example processing flow 400 with which streaming analytics by selective training data recirculation may be implemented, in accordance with at least some embodiments described herein. Processing flow 400 may be implemented by device 300 and/or system 104. Further, processing flow 400 may include one or more operations, actions, or functions depicted by one or more blocks 410, 420, 430 and 440. Although illustrated as discrete blocks, various blocks may be divided into additional blocks, combined into fewer blocks, or eliminated, depending on the desired implementation. Processing flow 400 may begin at block 410.

Block 410 (Gather Data) may refer to adaptive recirculation module 310 gathering, from machine learning unit 305, data as a training data. In some embodiments, adaptive recirculation module 310 may sift classified data from machine learning unit 305 to select some of the classified data that is known to be valid as the training data. In these instances, machine learning unit 305 may include streaming analytics unit 335 that uses an AdaBoost algorithm. Block 410 may be followed by block 420.

Block 420 (Label Data) may refer to adaptive recirculation module 310 labeling the data to identify the labeled data as the training data. In some embodiments, block 420 may refer to adaptive recirculation module 310 evaluating outputs of multiple analytics modules 325 including the one or more analytics modules of machine learning unit 305. Adaptive recirculation module 310 may determine an output of a first analytics module of the one or more analytics modules to be valid following a recirculation of the training data through the first analytics module, and/or exclude the first analytics module from the one or more analytics modules for training. In some instances, Adaptive recirculation module 310 may select the one or more analytics modules for training as a result of an output of each of the one or more analytics modules being invalid. Block 420 may be followed by block 430.

Block 430 (Recirculate Data) may refer to adaptive recirculation module 310 recirculating the labeled data for each of one or more analytics modules of multiple analytics modules 325 of machine learning unit 305. Block 430 may be followed by block 440.

In some embodiments, block 430 may refer to adaptive recirculation module 310 evaluating outputs of multiple analytics modules 325 of machine learning unit 305. In these embodiments, a list of the one or more analytics modules for training may be identified. In some embodiments, adaptive recirculation module 310 may identify the one or more analytics modules for training as a result of an output of each of the one or more analytics modules being invalid. Adaptive recirculation module 310 may also determine an output of a first analytics module of the one or more analytics modules to be valid following a recirculation of the training data through the first analytics module. In some embodiments, adaptive recirculation module 310 may exclude the first analytics module from the list of one or more analytics modules for training.

In some embodiments, block 430 may refer to adaptive recirculation module 310 calculating a respective number of times that the training data is to be recirculated to the respective analytics module for training for each of the one or more analytics modules. In these embodiments, adaptive recirculation module 310 may select a first analytics module of the one or more analytics modules for iterations of training, and then provide the training data as input to the first analytics module for the calculated respective number of times for the first analytics module. Adaptive recirculation module 310 may also provide the training data to remaining one or ones of the one or more analytics modules once.

In some embodiments, block 430 may refer to adaptive recirculation module 310 selecting a second analytics module of the one or more analytics modules for iterations of training, and providing the training data as input to the second analytics module for the calculated respective number of times for the second analytics module. Adaptive recirculation module 310 may also provide the training data to remaining one or ones of the one or more analytics modules once. Block 430 may be followed by block 440.

Block 440 (Filter Data) may refer to adaptive recirculation module 310 filtering out the labeled data from an output of machine learning unit 305.

Figure 5:
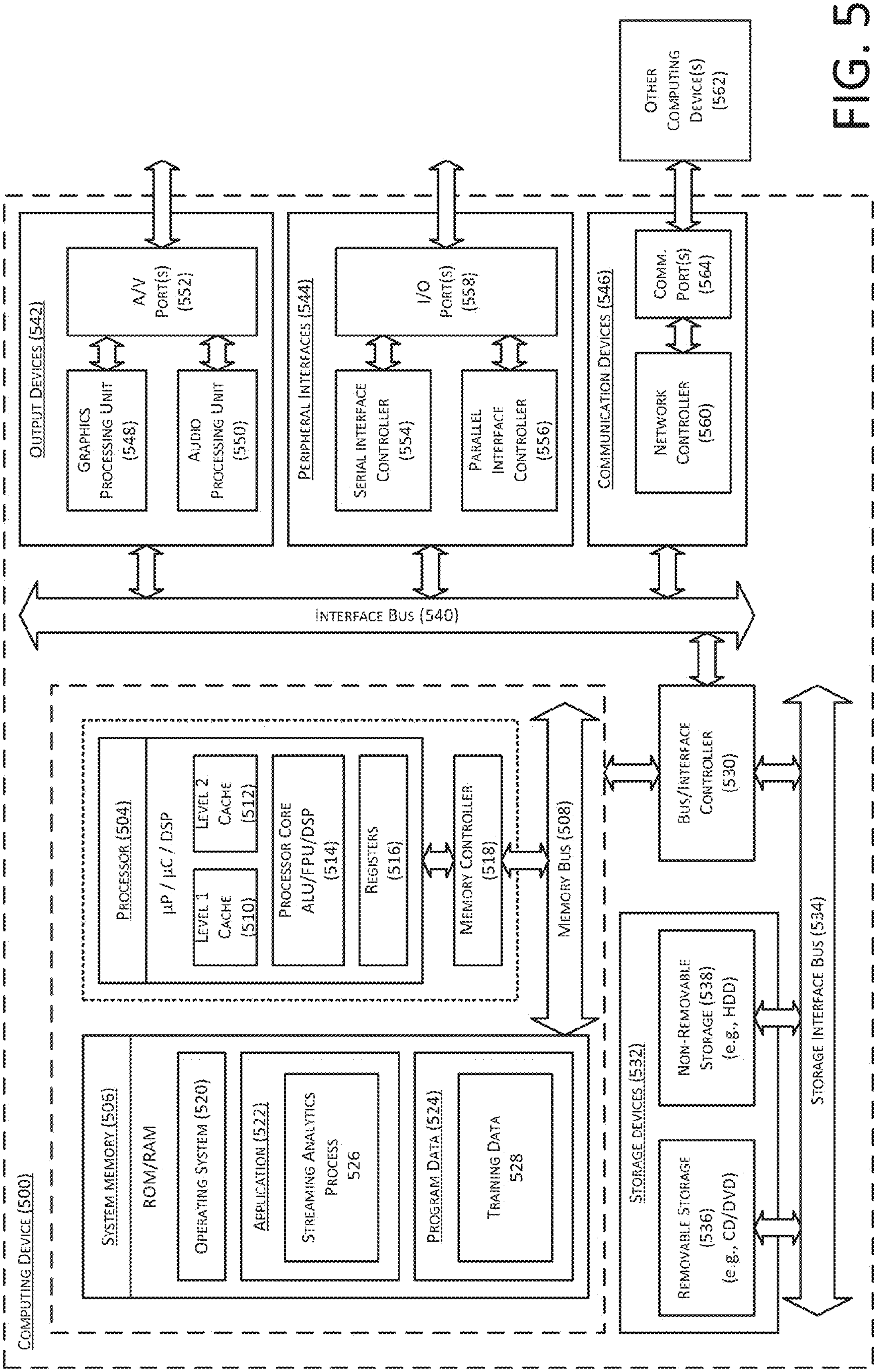
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a streaming analytics process 526 that is arranged to perform the functions as described herein including those described with respect to processing flow 400 of FIG. 4 (e.g., by system 104). Program data 524 may include training data 528 that may be useful for operation with streaming analytics process 526 as described herein. In some embodiments, application 522 may be arranged to operate with program data 524 on operating system 520 such that implementations of information transfer using an encryption key that can be used to encrypt messages may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 4546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

Computing device 500 may be implemented as a portion of a small-form factor portable (or mobile) electronic device such as a cell phone, a smartphone, a personal data assistant (PDA), a personal media player device, a wireless web-watch device, a personal headset device, an application specific device, or a hybrid device that include any of the above functions. Computing device 500 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for device configuration 300 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A computer implemented method, comprising:

receiving, by one or more analytics modules of a machine learning unit of a hardware processor, streaming input data that includes a plurality of portions;

analyzing, by the one or more analytics modules, a first portion of the plurality of portions of the streaming input data to generate a respective data item and a respective classifier score;

collecting the respective data item and the respective classifier score from each of the one or more analytics modules to generate a first stream of classified data;

gathering a training data from the first stream of classified data, wherein the gathering comprises sifting the first stream of classified data to select data that is known to be correctly classified as the training data;

labeling the training data by associating identifying information with the training data;

recirculating the labeled data, through at least one of the one or more analytics modules of the machine learning unit to train the at least one of the one or more analytics modules, wherein the one or more analytics modules, including the at least one module, analyze the labeled data simultaneously with a second portion of the plurality of portions of the streaming input data;

after the recirculating, obtaining a second stream of classified data as output from the one or more analytics modules of the machine learning unit;

filtering out the labeled data from the second stream of classified data; and after filtering out the labeled data, outputting the first stream of classified data and the second stream of classified data, wherein a false-positive rate and a false-negative rate of the at least one of the one or more analytics modules decreases after the recirculating.

2. The method of claim 1, wherein the input data is of transactions that include suspected fraud instances and wherein the gathering comprises sifting the stream of classified data to select one or more transactions of the stream of classified data that are verified as non-fraudulent as the training data.

3. The method of claim 1, wherein the recirculating comprises:

evaluating outputs of the one or more analytics modules of the machine learning unit; and based on the evaluating, identifying a list of the one or more analytics modules for training.

4. The method of claim 3, wherein the identifying comprises identifying the one or more analytics modules for training based on a classification output of each of the one or more analytics modules being incorrect.

5. The method of claim 3, wherein the evaluating comprises determining an output of a first analytics module of the one or more analytics modules to be correct following a recirculation of the labeled training data through the first analytics module, and wherein the identifying comprises excluding the first analytics module from the list of the one or more analytics modules for training.

6. The method of claim 3, wherein the recirculating further comprises:

for each of the one or more analytics modules, calculating a respective number of times that the labeled data is to be recirculated to a respective analytics module of the one or more analytics modules for training.

7. The method of claim 6, wherein the recirculating further comprises:

selecting a first analytics module of the one or more analytics modules for iterations of the training;

providing the labeled data as input to the first analytics module for the calculated number of times for the first analytics module; and providing the labeled data to remaining modules of the one or more analytics modules once.

8. The method of claim 1, wherein the machine learning unit comprises a streaming analytics unit that uses an Adaptive Boosting (AdaBoost) algorithm.

9. A non-transitory computer-readable storage medium having stored thereon computer-executable instructions executable by one or more computing devices to perform operations to:

receive, by one or more analytics modules, input data that includes a plurality of portions;

analyze, by the one or more analytics modules, a first portion of the plurality of portions of the input data to generate a respective data item and a respective classifier score;

collect the respective data item and the respective classifier score from each of the one or more analytics modules to generate a first stream of classified data;

gather a training data from the stream of classified data by sifting the first stream of classified data to select data that is known to be correctly classified as the training data;

identify the one or more analytics modules for training;

recirculate the training data through at least one of the one or more analytics modules a respective number of times to train the at least one of the one or more analytics modules to classify the training data, wherein the one or more analytics modules, including the at least one module, analyze the training data simultaneously with a second portion of the streaming input data;

obtain a second stream of classified data as output from the one or more analytics modules after recirculating the training data;

remove the recirculated training data from the second stream of classified data; and display the first stream of classified data and the second stream of classified data, wherein a false-positive rate and a false-negative rate of the at least one of the one or more analytics modules decreases after the recirculating.

10. The computer-readable storage medium of claim 9, wherein, the operations to identify the one or more analytics modules include operations to:

evaluate outputs of the one or more analytics modules; and select at least one of the one or more analytics modules from the one or more analytics modules for the training.

11. The computer-readable storage medium of claim 9, wherein sifting the stream of classified data is based on the respective classifier scores.

12. The computer-readable storage medium of claim 10, wherein, the operations to select the one or more analytics modules include at least one operation to select the one or more analytics modules for the training as a result of an output of each of the one or more analytics modules being incorrect.

13. The computer-readable storage medium of claim 10, wherein, the operations to evaluate the outputs include at least one operation to determine an output of a first analytics module of the one or more analytics modules to be correct following a recirculation of the training data through the first analytics module, and wherein, the operations to select the one or more analytics modules include at least one operation to exclude the first analytics module from the one or more analytics modules for the training.

14. The computer-readable storage medium of claim 9, further comprising at least one operation to:

label the training data by associating a training ID with each data item in the training data.

15. An apparatus, comprising:

a machine learning unit that includes at least one processor, the machine learning unit comprising:

a source module configured to provide streaming input data that includes a plurality of portions, a plurality of analytics modules, wherein each of the plurality of analytics modules is coupled to the source module to receive and analyze the streaming input data to provide a respective data item and a respective classifier score for each portion of the plurality of portions of the streaming input data, including a first portion and a second portion, and a joint module coupled to collect the data items and classifier scores from the plurality of analytics modules to provide a plurality of streams of classified data including a first stream of classified data corresponding to the first portion and a second stream of classified data corresponding to the second portion, wherein recirculated labeled data is removed from the second stream of classified data prior to providing the second stream of classified data; and an adaptive recirculation module coupled to the machine learning unit, wherein the adaptive recirculation module is configured to perform operations comprising:

gathering, from the joint module, training data from the first stream of classified data by sifting the first stream of classified data to select data that is known to be correctly classified as the training data, labeling the training data by associating identifying information with the training data, and recirculating the labeled data for a respective number of times through each of a subset of the plurality of analytics modules to train the plurality of analytics modules to classify the labeled data, wherein each of the subset of the plurality of analytics modules analyze the labeled data simultaneously with the second portion of the streaming input data, wherein a false-positive rate and a false-negative rate of the at least one of the plurality of analytics modules decreases after the recirculating, and a final data receiving module configured to derive conclusions from the stream of classified data or to log the plurality of streams of classified data.

16. The apparatus of claim 15, wherein recirculating by the adaptive recirculation module comprises:

evaluating outputs of the plurality of analytics modules; and identifying the subset of the plurality of analytics modules for the training.

17. The apparatus of claim 16, wherein, identifying by the adaptive recirculation module comprises identifying the subset of the analytics modules for the training based on a result of an output of each of the subset of the plurality of analytics modules being incorrect.

18. The apparatus of claim 16, wherein, evaluating by the adaptive recirculation module comprises determining an output of a first analytics module of the subset of the analytics modules to be correct following a recirculation of the labeled data through the first analytics module, and wherein the identification comprises an exclusion of the first analytics module from the subset of the analytics modules for the training.

19. The apparatus of claim 16, wherein recirculating by the adaptive recirculation module comprises:

calculating, for each respective analytics module of the subset of the analytics modules, a respective number of times that the labeled data is to be recirculated to the respective plurality of analytics module for the training.

20. The apparatus of claim 19, wherein recirculating by the adaptive recirculation module comprises:

selecting a first analytics module of the subset of the plurality of analytics modules for iterations of the training;

providing the labeled data as input to the first analytics module for the calculated respective number of times for the first analytics module; and providing the labeled data to remaining modules of the subset of the plurality of analytics modules once.

21. The apparatus of claim 15, wherein the machine learning unit comprises a streaming analytics unit that uses an Adaptive Boosting (AdaBoost) algorithm.

22. The method of claim 1, wherein the identifying information comprises a training ID.

23. The method of claim 1, wherein labeling the training data by associating identifying information with the training data comprises altering at least one record in a respective data item in the stream of classified data to add an identifier.

24. The computer-readable storage medium of claim 9, further comprising at least one operation associate identifying information with the training data by altering at least record in a respective data item in the stream of classified data to add an identifier.

25. The apparatus of claim 15, wherein labeling the training data comprises associating a training ID with each data item in the training data.

26. The apparatus of claim 15, wherein labeling the training data comprises associating identifying information with the training data by altering at least one record in a respective data item in the stream of classified data to add an identifier.

* * * * *